United States Patent [19]
Ishikawa et al.

[11] Patent Number: 5,339,516
[45] Date of Patent: Aug. 23, 1994

[54] APPARATUS FOR ASSEMBLING CORD FASTENERS

[75] Inventors: Kiichiro Ishikawa, Marietta; Yasutaka Nishida, Macon, both of Ga.

[73] Assignee: YKK Corporation, Lyndhurst, N.J.

[21] Appl. No.: 104,617

[22] Filed: Aug. 11, 1993

[51] Int. Cl.⁵ ............................................. B23P 21/00
[52] U.S. Cl. ............................................ 29/705; 29/707; 29/789; 29/809; 29/818; 29/282; 29/453
[58] Field of Search .................... 29/281.5, 282, 453, 29/705, 707, 717, 787, 789, 809, 818

[56] References Cited

U.S. PATENT DOCUMENTS

| | | | |
|---|---|---|---|
| 3,992,765 | 11/1976 | Silverbush | 29/787 X |
| 4,130,935 | 12/1978 | Randolph | 29/789 X |
| 4,135,285 | 1/1979 | Weiner | 29/707 X |
| 4,170,820 | 10/1979 | Klose | 29/789 |
| 4,494,306 | 1/1985 | Immonen | 29/809 |
| 4,724,584 | 2/1988 | Kasai | 24/115 |
| 4,962,580 | 10/1990 | Matsuda | 29/809 X |

Primary Examiner—Mark Rosenbaum
Assistant Examiner—S. Thomas Hughes
Attorney, Agent, or Firm—Hill, Steadman & Simpson

[57] ABSTRACT

A cord fastener assembling apparatus includes a first inclined chute for gravity delivery of a succession of female members to a first pocket and a second inclined chute for gravity delivery of a succession of male member to a second pocket which is aligned with the first pocket. An assembling block is reciprocally movable between an assembling position in which an assembling chamber is disposed between AND aligned with the first and second pockets and a discharging position remote from the assembling position. First and second rod-like pushers are reciprocally movable, in timed relation to one another, to force the female member and the male member, respectively, form the first and second pockets into the assembling chamber of the assembling clock. Within the assembling chamber, the female member and the male member are forcibly coupled together into an assembled cord fastener.

18 Claims, 11 Drawing Sheets

F I G. 10
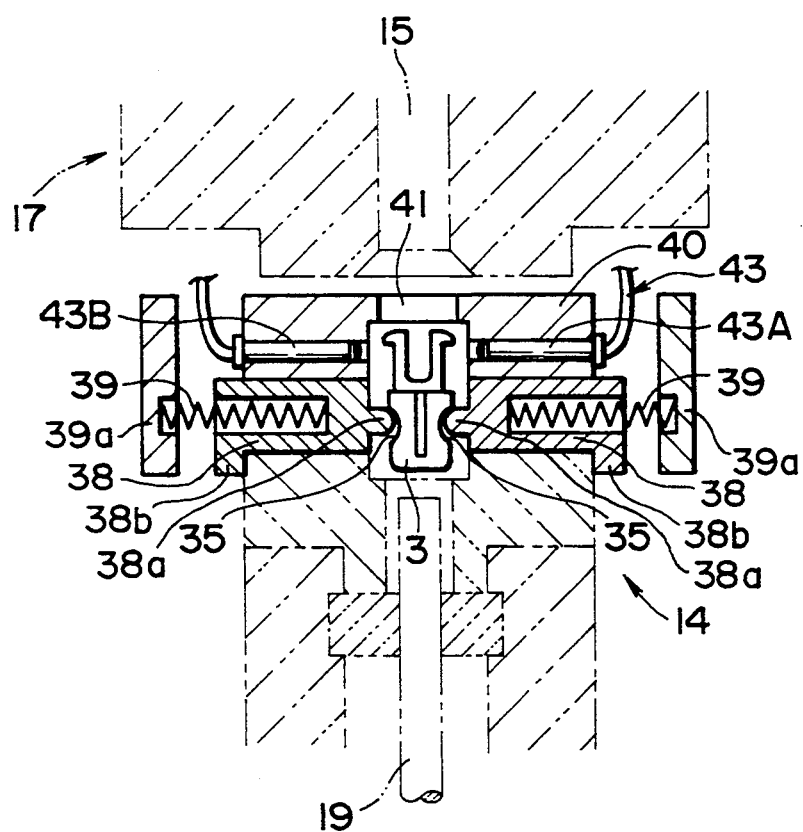

APPARATUS FOR ASSEMBLING CORD FASTENERS

BACKGROUND OF THE INVENTION

1. Field of the Invention

This invention relates to an apparatus for automatically assembling a cord fastener which is used for adjustably fastening or stopping a fastening cord or string attached to a helmet, a hat, a bag, a garment, or other various articles. More particularly, the cord fastener to be assembled on the apparatus is of the type which is molded of synthetic resin and constructed to utilize a spring force in locking a cord in position against displacement.

2. Description of the Prior Art

Various cord or string fasteners are known in the art which are attached to cords or strings on helmets, hats, bags, garments, or other objects for adjustably fastening or stopping the cords by using a spring force. One such prior cord fastener is disclosed in U.S. Pat. No. 4,724,584 issued on Feb. 16, 1988 and assigned to the present assignee.

The disclosed cord fastener, as illustrated here in FIGS. 2 and 3, is composed of two fastener members coupled together. One of the two fastener members is a male member 3 composed of a substantially cylindrical head 3A and a pair of resilient legs 3B, 3B extending integrally and downwardly from the head 3A. The other fastener member is a socket-like female member 6 composed of a substantially hollow cylindrical body 6A. The head 3A of the male member 3 has a transverse cord insertion through-hole 2 for receiving therein a cord. The body 6A of the female member 6 has an axial blind hole 4 opening upwardly for receiving therein the legs 3B and the head 3A of the male member 3. The axial blind hole 4 has a cross-sectional shape which is lockingly engageable with the male member 3. The female member 6 further has a pair of diametrically opposite cord insertion holes 5 communicating with the axial blind hole 4. The cord insertion holes 5 are alignable with the cord insertion through-hole 2 of the male member 3 for receiving the cord. The male and female members 3, 6 are molded of synthetic resin such as polyacetal or polyamide, The resilient legs 3B, 3B each have an engagement portion 7 which is formed as an enlarged foot projecting laterally outwardly from a lower end of the resilient leg 3B, 3B. The engagement portions 7, 7 are resiliently displaceable as indicated by the phantom lines shown in FIG. 3, in response to resilient deformation of the corresponding legs 3B, 3B. The female member 6 includes two opposed engagement portions 8 formed, as a pair of diametrically opposite retaining lugs, on an inside surface of the axial blind hole 4. When the male member 3 is inserted into the axial blind hole 4 of the female member 6, the foot-like engagement portions 7 of the male member 3 are interlocked with the lug-like engagement portions 8 of the female member 6. Thus, the male member 3 and the female member 6 are assembled into a cord fastener 1.

The thus assembled cord fastener 1 is attached to a cord 9 on a garment, such as outerwear (not shown), in a manner shown in FIG. 4. The cord 9 which is threaded through one of the cord insertion holes 5, the cord insertion through-hole 2 and the other cord insertion hole 5 is locked in position against displacement by a spring force which is generated from co-action between the resilient legs 3B, 3B of the male member 3 and a tapered inner surface 4A of the female member 6.

Heretofore, the cord fastener 1 has been assembled manually by the operator. Such a manual assembling operation requires a muscle effort when the male member 3 is forced into the axial blind hole 4 in the female member 6 against the resiliency of the legs 3B, 3B until the foot-like engagement portions 7 of the male member 3 are interlocked with the corresponding lug-like engagement portions 8 of the female member 6. Thus, the manual assembling operation is laborious and tends to tire out the operator, and can only produce assembled cord fasteners at a limited efficiency.

SUMMARY OF THE INVENTION

With the foregoing drawbacks in view, it is an object of the present invention to provide an apparatus for automatically assembling a cord fastener composed of two fastener members.

Another object of the present invention is to provide an automatic cord-fastener assembling apparatus which is simple in construction, reliable in operation, easy to control and able to mass-produce the cord fastener.

According to the present invention, there is provided an apparatus for assembling a cord fastener which is comprised of a male member and a female member. The male member is composed of a head having a transverse cord insertion through-hole, and at least one resilient leg extending integrally from the head in a perpendicular direction of the transverse cord insertion through-hole and having an engagement portion. The female member is composed of a hollow body having an axial hole extending from an open end of the hollow body for receiving therein the leg and head, a pair of diametrically opposite transverse cord insertion holes communicating with the axial hole, and at least one engagement portion projecting into the axial hole. The engagement portion of the female member is interlocked with the engagement portion of the resilient leg to couple the male member and the female member. The male member and the female member are relatively displaceable toward and away from each other, by and against a resilient force of the leg acting on an inner surface of the axial hole, so that the transverse cord insertion through-hole is brought into and out of coaxial alignment with the transverse cord insertion holes.

The cord fastener assembling apparatus includes a first inclined chute for delivering by gravity a succession of female members in a first direction, with the open ends of the respective female members facing toward a second direction which is perpendicular to the first direction. A first pocket is disposed on a lower end of the first inclined chute for receiving a leading one of the successive female members from the first inclined chute and temporarily holding therein the leading female member, with the open end of the leading female member facing toward the second direction. The apparatus further includes a second inclined chute extending parallel to, and vertically spaced from, the first inclined chute for delivering by gravity a succession of male members in a third direction parallel to the first direction, with the resilient legs of the respective male members directed toward a fourth direction which is opposite to the second direction. A second pocket is disposed on a lower end of the second inclined chute for receiving a leading one of the successive male members from the second inclined chute and temporarily holding therein the leading male member, with the resilient leg of the leading male member directed in the fourth direction, the second pocket being vertically spaced from the first pocket and aligned with the first pocket. An assembling block has an elongated assembling chamber for receiving therein the female member and the male member which are delivered respectively from the first pocket and the second pocket. The assembling block is reciprocally movable between an assembling position in which the assembling chamber is disposed between and aligned with the first and second pockets, and a discharging position in which the assembling chamber is disposed out of alignment with the first and second pocket for enabling discharge of an assembled cord fastener from the cylindrical assembling chamber. The apparatus further has a first pusher reciprocally movable into and out of the first pocket for forcing the female member from the pocket into the assembling chamber of the assembling block, and a second pusher reciprocally movable, in timed relation to the reciprocating movement with the first pusher, into and out of the second pocket for forcing the male member from the second pocket into the assembling chamber so as to ensure that the engagement portions of the male member and the engagement portions of the female member are interlocked with each other to couple the male member and the female member within the assembling chamber.

The apparatus may further include a first sensor which is associated with the first pocket for detecting the presence/absence of the leading female member within the first pocket, and a second sensor which is associated with the second pocket for detecting the presence/absence of the leading male member within the second pocket. Each of the first and second sensors is constructed to stop operation of the apparatus when the absence of the corresponding leading member is detected. Preferably, the sensors comprise a photosensor composed of a light projector and a photocell that are confronted with each other across an internal space of the corresponding pocket.

An inspection means may be associated with the assembling block for determining whether the cord fastener which has been assembled within the assembling chamber is a defective cord fastener or a non-defective cord fastener. The inspection means may be a photosensor which is constructed to detect the occurrence of a relative axial displacement between the male member and the female member within the assembling chamber.

The head of the male member may be cylindrical and has a pair of arcuate recesses formed at opposite ends of the transverse cord insertion through-hole. The first inclined chute includes a pair of parallel spaced, elongated side plates each having an inner longitudinal edge slidably engageable with a corresponding one of the arcuate recesses of the male member for guiding the male member as the male member is delivered through the first inclined chute. Similarly, the body of the female member may be a hollow cylinder having a pair of arcuate recesses formed at outer ends of the respective transverse cord insertion holes. The second inclined chute includes a pair of parallel spaced, elongated side plates each having an inner longitudinal edge slidably engageable with a corresponding one of the arcuate recesses of the female member for guiding the female member as the female member is delivered through the second inclined chute.

Each of the first and second pockets includes a pair of confronting support blocks reciprocally movable toward and away from each other for releasably holding therebetween the male or female member within the corresponding pocket by using the arcuate recesses of the male or female member. To this end, each of the support blocks has at its inner end a guide projection which is receivable in a corresponding one of the arcuate recesses of the male or female member.

The assembling block is composed of two block halves which are symmetrical with each other about a plane containing a longitudinal central axis of the assembling chamber, and a spring means acting between the block halves that urges them toward each other. The block halves are displaceable in a direction away from each other against the force of the spring means when the assembling block is disposed in the discharging position. An air jet means such as a nozzle is associated with at least one of the block halves for ejecting a stream of air into the assembling chamber to release the assembled cord fastener from the assembling chamber.

The above and other objects, features and advantages of the present invention will become more apparent to those versed in the art upon making reference to the detailed description and accompanying sheets of drawings in which a preferred structural embodiment incorporating the principles of the present invention is shown by way of illustrative example.

BRIEF DESCRIPTION OF THE DRAWINGS

FIG. 10 is a cross-sectional view taken along line X—X of FIG. 8, showing with parts tilted clockwise at an angle of 90° on the plane of the drawing sheet;

DETAILED DESCRIPTION OF THE INVENTION

Figure 1:
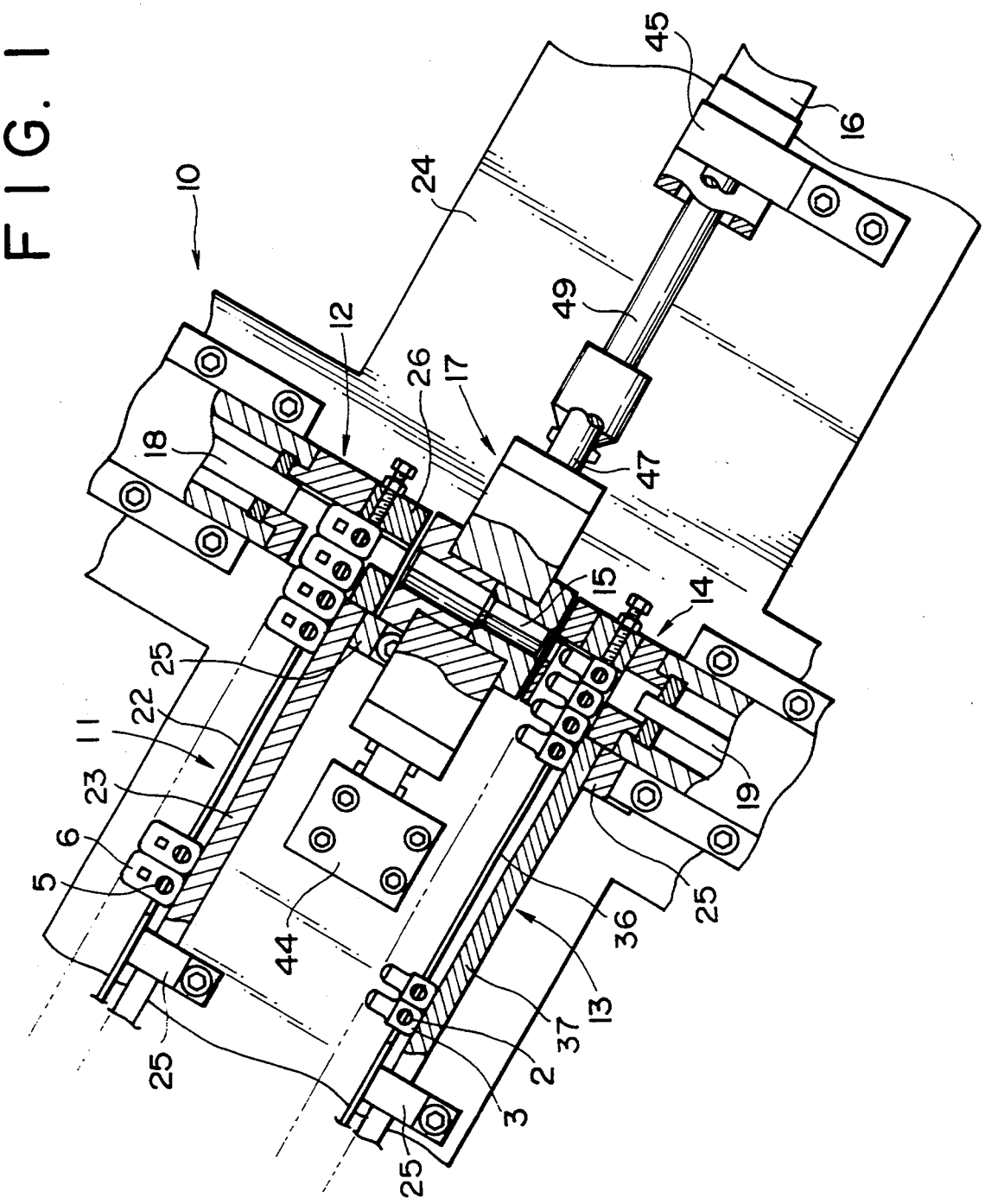
FIG. 1 is a front elevational view, with parts cutaway for clarity, of a main portion of a cord fastener assembling apparatus according to the present invention.

FIG. 1 shows an apparatus 10 embodying the present invention for automatically assembling a cord fastener. The cord fastener to be assembled on the apparatus 10 is identical to the cord fastener 1 which is already described above under the heading "Description of the Prior Art" in conjunction with FIGS. 2(A), 2(B) and 3. The cord fastener 1 is composed of two fastener members, viz., a male member 3 and a female member 6. A further description of the cord fastener 1 will be omitted to avoid duplication.

As shown in FIG. 1, the apparatus 10 generally comprises a first inclined chute 11, a first pocket 12, a second inclined chute 13, a second pocket 14, an assembling block 17, a first pusher 18 and a second pusher 19, all of the components being supported on a vertical support plate 24.

The first inclined chute 11 is constructed to deliver by gravity a succession of female members 6 in a obliquely downward first direction from a first parts feeder (not shown) to the first pocket 12. During the gravity delivery through the first inclined chute 11, each of the female members 6 is oriented such that the open end of each female member 6 faces toward an obliquely downward second direction which is perpendicular to the first direction.

The first pocket 12 is disposed on a lower end of the first inclined chute 11 for receiving a leading one of the successive female members 6 from the first inclined chute 11 and temporarily holding the leading female member 6 within the first pocket 12 while keeping the leading female member 6 in the same orientation or posture as the gravity delivery described above.

The second inclined chute 13 is disposed below the first inclined chute 11 and extends parallel to the first inclined chute 11 with a space therebetween. The second inclined chute 13 is constructed to deliver by gravity a succession of male members 3 in an obliquely downward third direction from a second parts feeder (not shown) to the second pocket 14. The third direction is parallel to the first direction. During the gravity delivery through the second inclined chute 13, each of the male members 3 is oriented such that the resilient legs 3B, 3B (FIG. 2(A)) are directed toward an obliquely upward fourth direction opposite to the second direction.

The second pocket 14 is disposed on a lower end of the second inclined chute 13 for receiving a leading one of the successive male members 3 from the second inclined chute 12 and temporarily holding the leading male member 3 within the second pocket 14, while keeping the leading male member 3 in the same orientation or posture as the gravity delivery described above. The second pocket 14 is downwardly spaced from the first pocket 12 and is aligned with the first pocket 12.

The assembling block 17 has a stepped, substantially cylindrical assembling chamber 15 for receiving therein the leading female member 6 and the leading male member 3 which are delivered respectively from the first pocket 12 and the second pocket 14. The assembling block 17 is reciprocally movable by a suitable drive means, such as a fluid-pressure actuator 16, between an assembling position in which the assembling chamber 15 is disposed between and aligned with the first pocket 12 and the second pocket 14, and a discharge position in which the assembling chamber 15 is disposed out of alignment with the first and second pockets and 14 for discharging an assembled cord fastener from the assembling chamber 15. The assembling block 17 is normally disposed in the assembling position.

The first pusher 18 and the second pusher 19 are reciprocably movable, in timed relation to one another, to feed the female member 6 and the male member 3 from the first pocket 12 and the second pocket 14 into the assembling chamber 15 and force the female and male members 6, 3 together into an assembled cord fastener 1 within the assembling chamber 15.

Figure 2A:
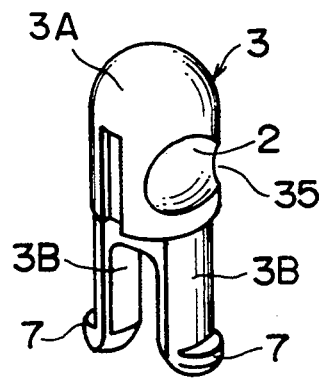
FIG. 2(A) is a perspective view of a male member which forms one part of a cord fastener to be assembled on the cord fastener assembling apparatus.
Figure 2B:
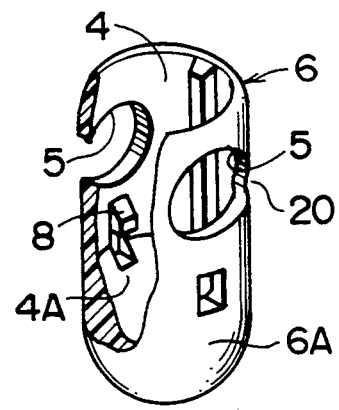
FIG. 2(B) is a perspective view, with parts broken away for clarity, of a female member which forms the other part of the cord fastener to be assembled on the cord fastener assembling apparatus.
Figure 3:
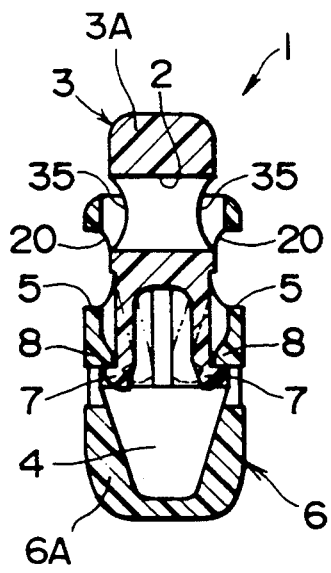
FIG. 3 is a cross-sectional view of a cord fastener which is assembled by the cord fastener assembling apparatus.

As previously described, the female member 6 has a hollow cylindrical body 6A, so that an outer end of each of the transverse cord insertion holes 5 provides a substantially arcuate recess 20, as shown in FIGS. 2(B) and 3. The arcuate recesses 20 are utilized to keep the female members 6 in a predetermined orientation or posture while the female members 6 are delivered through the first inclined chute 11.

Figure 6:
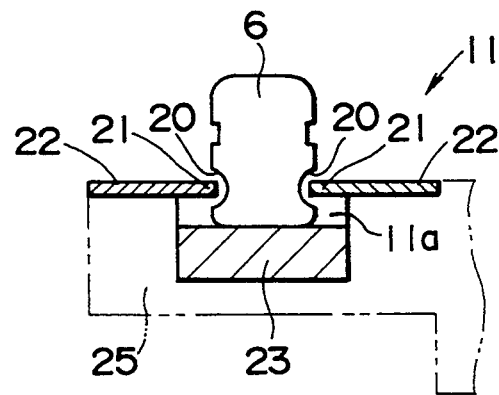
FIG. 6 is a cross-sectional view taken along line VI—VI of FIG. 5, showing with parts tilted clockwise at an angle of 90° on the plane of the drawing sheet.

As shown in FIG. 6, the first inclined chute 11 includes a pair of parallel spaced, elongated side plates 22 and 22. Each of the side plates 22 has an inner longitudinal edge 21 which is loosely receivable in, and slidably engageable with, a corresponding one of the arcuate recesses 20 of the female member 6. The first inclined chute 11 further includes an elongated bottom plate 23 disposed below the side plates 22. The bottom plate 23 is located centrally between the side plates 22 for slidably supporting thereon a lower end (an open end) of the female member 6. The side plates 22, 22 and the bottom plate 23 jointly define therebetween a longitudinal guide track 11a for the passage therethrough of the female members 6. The side plates 22 and the bottom plate 23 are attached to the vertical support plate 24 (FIG. 1) via a plurality of brackets 25 (only one shown in FIG. 6) in such a manner that the first inclined chute 11 slopes downwardly from the left to the right on FIG. 1. Though not shown, an upper end of the first inclined chute 11 is connected to the non-illustrated first parts feeder. With the first inclined chute 11 thus constructed, a succession of the female members 6 can be stably and reliably delivered from the first parts feeder to the first pocket 12, with the open end of the respective female member 6 facing in an obliquely downward direction which is perpendicular to the direction of movement of the female members 6 along the first inclined chute 11.

Figure 5:
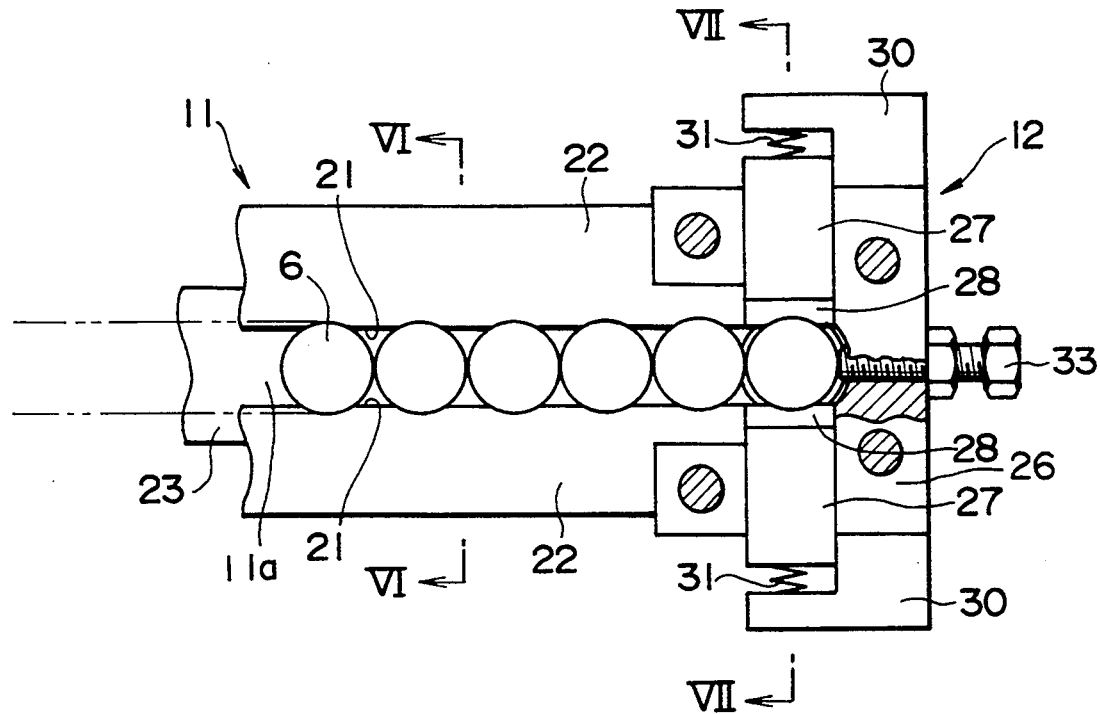
FIG. 5 is a plan view, with parts broken away for clarity, of a first chute and a first pocket of the cord fastener assembling apparatus shown in FIG. 1.
Figure 7:
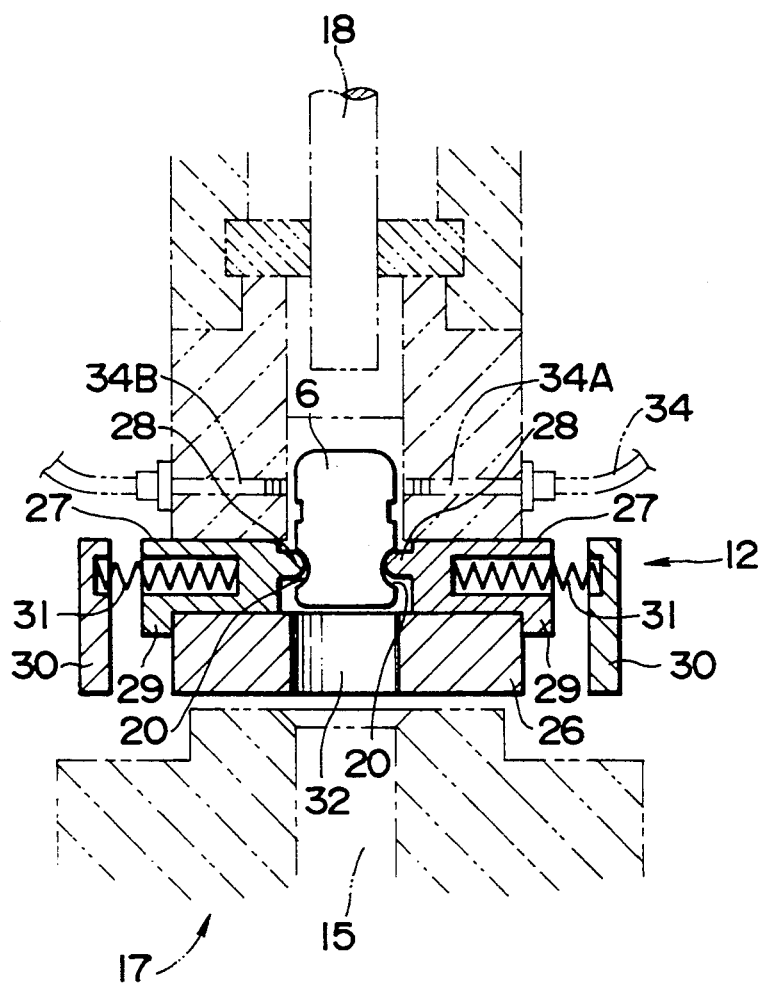
FIG. 7 is a cross-sectional view taken along line VII—VII of FIG. 5, showing with parts tilted clockwise at an angle of 90° on the plane of the drawing sheet.

The first pocket 12, as shown in FIGS. 5 and 7, is constructed so as to receive a leading one of the female members 6 which are delivered in succession from the first inclined chute 11. The first pocket 12 includes a base plate 26 located at a lower end of the bottom plate 23 (FIG. 1) and two confronting support blocks 27, 27 slidably disposed on the base plate 26. The support blocks 27, 27 are disposed adjacent the lower ends of the corresponding side plates 22, 22, and they are reciprocally movable toward and away from each other. The support blocks 27, 27 have, at their confronting inner ends, guide ridges or projections 28, 28 which are normally disposed in longitudinal alignment with the inner longitudinal edges 21, 21 of the corresponding slide plates 22 of the first inclined chute 11. When the leading female member 6 moves into the first pocket 12, the guide projections 28, 28 are loosely fitted in the arcuate recesses 20, 20 of the thus-received female member 6, so that the female member 6 is stably held within the first pocket 12. To secure the loose fitting between the guide projections 28 and the arcuate recesses 20, the support blocks 27 have downwardly projecting stopper lugs 29 (FIG. 7) formed at the respective outer ends of the support blocks 28. The stopper lugs 29 are engageable with the base plate 26 to limit the movement of the corresponding support blocks 27 in a direction toward each other. To enable the support blocks 27 to move toward and away from each other, two L-shaped spring retainer blocks 30, 30 are disposed adjacent the support blocks 27, 27, and a resilient means in the form of a compression coil spring 31 is disposed between each of the support blocks 27 and the corresponding one of the spring retainer blocks 30. The compression coil springs 31 thus arranged normally urge the support blocks 27 in an advanced position in which the stopper lugs 29 abut on the base plate 26.

The first pusher 18 has a rod-like shape and is disposed above the first pocket 12. The rod-like first pusher 18 extends in a direction perpendicular to the direction of movement of the female members 6 along the first inclined chute 11. The base plate 26 of the first pocket 12 has a through-hole 32 for the passage therethrough of the female member 6, as shown in FIG. 7. The through-hole 32 is aligned with the rod-like first pusher 18 which is driven to force the female member 6 through the through-hole 32. The rod-like first pusher 18 is reciprocated by a suitable drive means, such as a fluid-pressure actuator (not shown). When the rod-like first pusher 18 is driven forwardly, the female member 6 which has been held within the first pocket 12 by and between the spring-loaded support blocks 27 is forced downward and moves into the assembling chamber 15 in the assembling block 17 through the through-hole 32 in the base plate 26. In this instance, the support blocks 27 are retracted or spread out against the force of the compression coil springs 31. Then, the rod-like first pusher 18 is driven backward whereupon the next female member 6 is delivered by gravity from the first inclined chute 11 into the first pocket 12. The thus delivered female member 6 is temporarily held within the first pocket 12 by means of the confronting support blocks 27 until the first pusher 18 is advanced again.

A first position adjustment screw 33 is threaded through the base plate 26 in alignment with the guide track 11a of the first inclined chute 11, as shown in FIG. 5. The first position adjustment screw 33 is engageable with the female member 6 to adjust the position of the female member 6 such that the female member 6 is held within the first pocket 12 in accurate alignment with the through-hole 32 of the base plate 26.

As shown in FIG. 7, a first micro photosensor 34 is associated with the first pocket 12 for detecting the presence/absence of the female member 6 within the first pocket 12. The first micro photosensor 34 is known per se and is composed of a light projector 34A and a photocell 34B which are confronted with each other across an interior space of the first pocket 12 in which the female member 6 is received. The first micro photosensor 34 is operatively connected with a control system or unit (not shown) of the apparatus 10 such that when the first micro photosensor 34 detects the absence of the female member 6 within the first pocket 12, the control unit immediately stops the operation of the entire apparatus 10. With the first micro photosensor 34 thus provided, it is possible to avoid production of a defective cord fastener which is devoid of the female member 6.

Like the body 6A of the female member 6, the head 3A of the male member 3 has a substantially cylindrical shape, so that opposite ends of the cord insertion transverse through-hole 2 are configured to provide substantially arcuate recesses 35, 35, as shown in FIGS. 2(A) and 3. The arcuate recesses 35 of each male member 3 are utilized to keep the male members 3 in a predetermined orientation or posture while the male members 3 are delivered through the second inclined chute 13.

Figure 8:
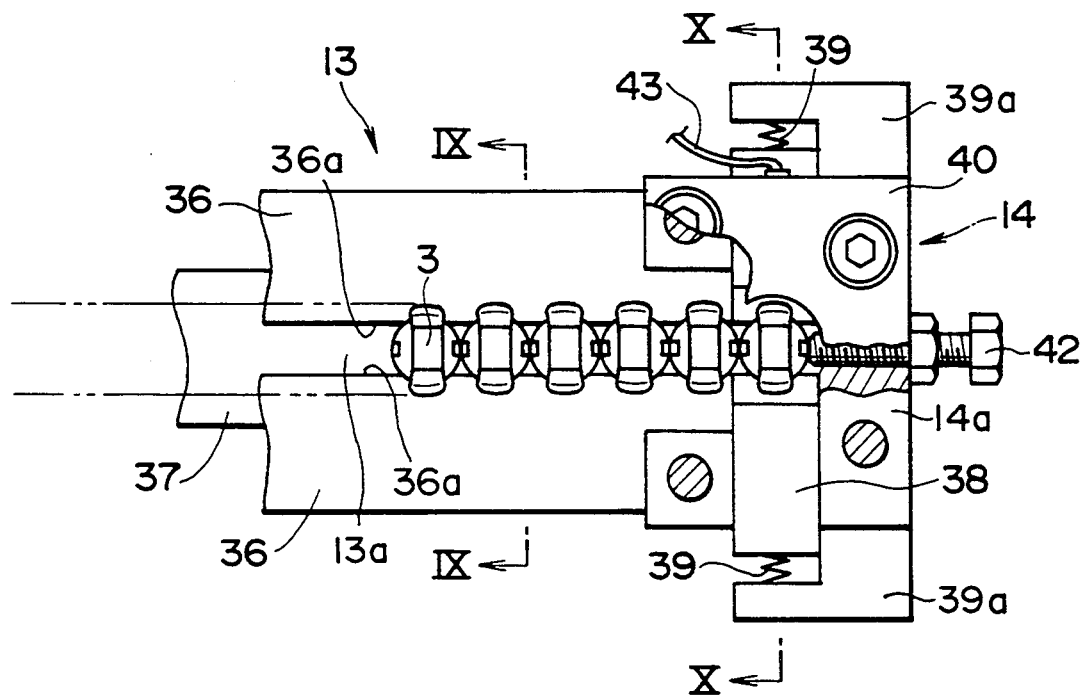
FIG. 8 is a plan view, with parts broken away for clarity, of a second chute and a second pocket of the cord fastener assembling apparatus shown in FIG. 1.
Figure 9:
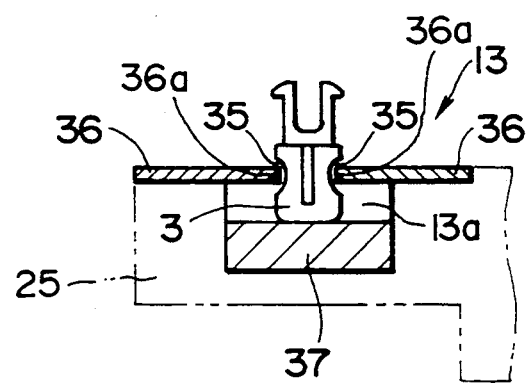
FIG. 9 is a cross-sectional view taken along line IX—IX of FIG. 8, showing with parts tilted clockwise at an angle of 90° on the plane of the drawing sheet.

The second inclined chute 13 shown in FIGS. 8 and 9 is substantially the same in construction as the previously described first inclined chute 11 shown in FIGS. 5 and 6, so only a brief description will be given of the second inclined chute 13. The second inclined chute 13 has a longitudinal guide track 13a defined by and between a pair of parallel spaced, elongated side plates 36 and a bottom plate 37 which is disposed below, and located centrally between, the side plates 36. Each of the side plates 36 has an inner longitudinal edge 36a loosely receivable in, and slidably engageable with, a corresponding one of the arcuate recesses 35 of the male member 3. The second inclined chute 13 is attached to the vertical support plate 24 (FIG. 1) via a plurality of brackets 25 (only one shown in FIG. 9 ). Though not shown, an upper end of the second inclined chute 13 is connected to the non-illustrated second parts feeder. With the first inclined chute 13 thus constructed, a succession of the male members 3 can be stably and reliably delivered from the second parts feeder 13 to the second pocket 14, with the resilient displaceable, foot-like engagement portions 7 of the male members 3 directed in an obliquely upward direction which is perpendicular to the direction of movement of the male members 3 along the second inclined chute 13.

The second pocket 14 shown in FIGS. 8 and 10 is constructed to receive and temporarily hold a leading one of the successive male members 3 which are delivered from the second inclined chute 13. The second pocket 14 is substantially the same in construction as the first pocket 12 described above with reference to FIGS. 5 and 7, so that a brief description will be given of the second pocket 14. The second pocket 14 is provided with two opposed support blocks 38, 38 which are slidably supported on a base plate 14a in juxtaposition with the lower ends of the respective side plates 36, 36. The support blocks 38 are movable toward and away from each other between an advanced position in which guide ridges or projections 38a on the inner ends of the respective support blocks 38 are loosely fitted in the arcuate recesses 35 of the male member 3 for holding the male member 3 within the second pocket 14, as shown in FIG. 10, and a retracted position in which the guide projections 38a of the support blocks 38 are disengaged from the arcuate recesses 35 of the male member 3. The support blocks 38 are normally disposed in the advanced position in which stopper lugs 38b on the respective support blocks 38 abut on the base plate 14a. A resilient means comprises a compression coil spring 39 and acts between each of the support blocks 38 and one of two L-shaped spring retaining blocks 39a which are disposed near the support blocks 38, respectively. The support blocks 38 are normally urged into the advanced position by means of the compression coil springs 39.

The second pusher 19 has a rod-like shape and is disposed below the second pocket 14. The rod-like second pusher 19 extends in alignment with the rod-like first pusher 18 and is movable into and out of the second pocket 14 for forcibly supplying the male member 3 into the assembling block 17. As shown in FIG. 10, a cover plate 40 is attached to an upper end of the second pocket 14. The cover plate 40 has a through-hole 41 for the passage therethrough of the male member 3. The through-hole 41 is aligned with the rod-like second pusher 19. The rod-like second pusher 19 is reciprocated by a suitable drive means, such as a fluid-pressure actuator (not shown). When the rod-like second pusher 19 is driven forwardly, the male member 3 which has been held within the second pocket 14 by the spring-loaded support blocks 27 is forced upwardly and moves into the assembling chamber 15 in the assembling block 17 through the through-hole 41 in the cover plate 40. In this instance, the support blocks 38 are retracted or spread out against the force of the compression coil springs 39. Then, the rod-like second pusher 19 is driven backward whereupon the next male member 3 is delivered by gravity from the second inclined chute 13 into the second pocket 14. The thus delivered male member 3 is temporarily held within the second pocket 14 by means of the confronting support blocks 38 until the rod-like second pusher 19 is advanced again.

As shown in FIG. 8, a second position adjustment screw 42 is threaded through the base plate 14a and aligned with the guide track 13a of the second inclined chute 13. The second position adjustment screw 42 is engageable with the male member 3 to adjust the position of the male member 3 such that the male member 3 is held within the second pocket 14 in alignment with the through-hole 41 of the cover plate 40.

As shown in FIG. 10, a second micro photosensor 43 is associated with the second pocket 14 for detecting the presence/absence of the male member 3 wi thin the second pocket 14. The second micro photosensor 43 is composed of a light projector 43A and a photocell 43B which are mounted in the cover plate 40 in confrontation with each other across an interior space of the second pocket 14 in which the male member 3 is received. Like the previously mentioned first micro photosensor 34, the second micro photosensor 43 is operatively connected with the non-illustrated control unit of the apparatus 10 such that when the second micro photosensor 43 detects the absence of the male member 3 within the second pocket 14, the control unit immediately stops the operation of the entire apparatus 10. With the second micro photosensor 43 thus provided, it is possible to avoid production of a defective cord fastener which is devoid of the male member 3.

Figure 11:
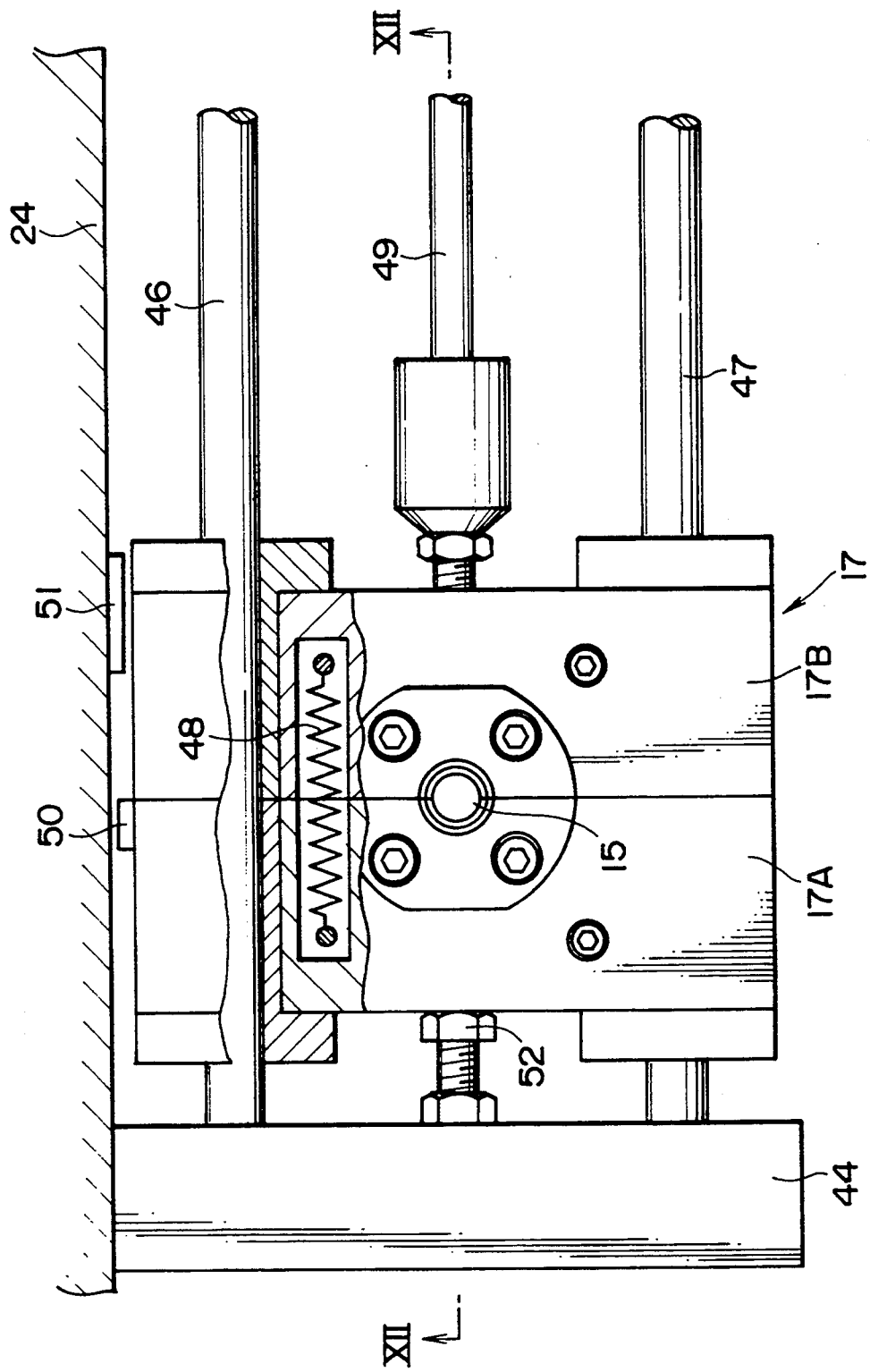
FIG. 11 is a plan view, with parts broken away for clarity, of an assembling block of the cord fastener assembling apparatus shown in FIG. 1.
Figure 12:
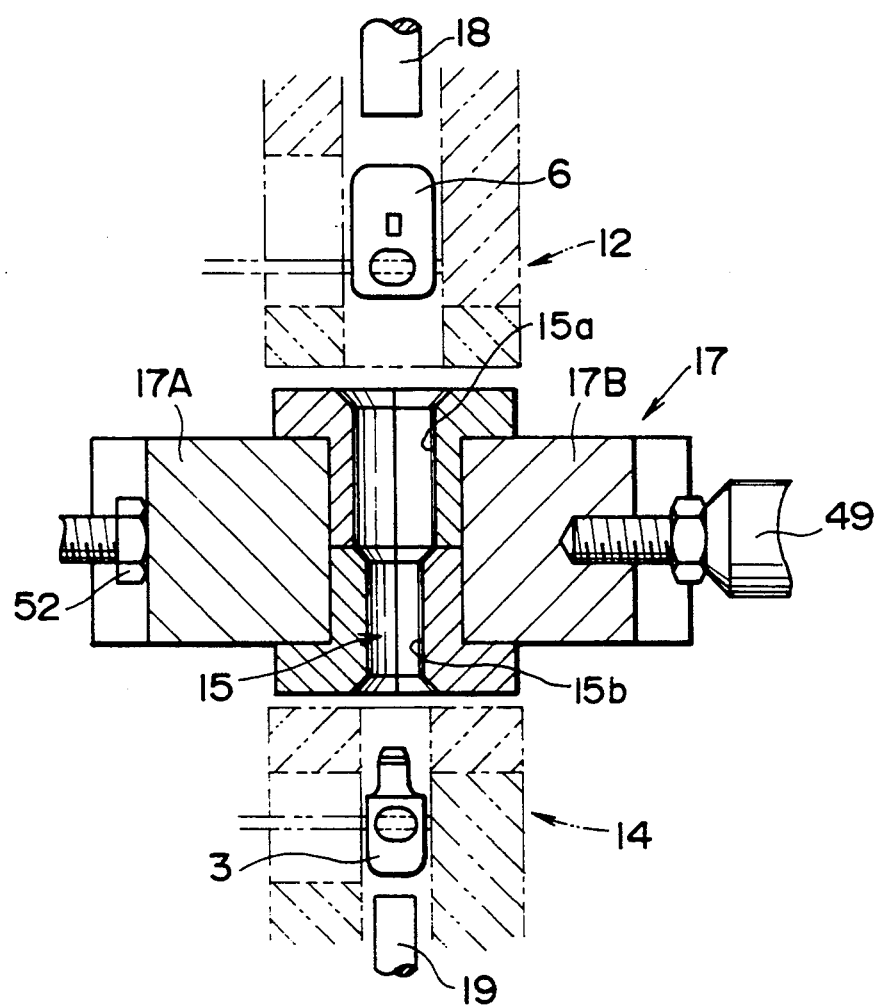
FIG. 12 is a cross-sectional view taken along line XII—XII of FIG. 11.
Figure 14:
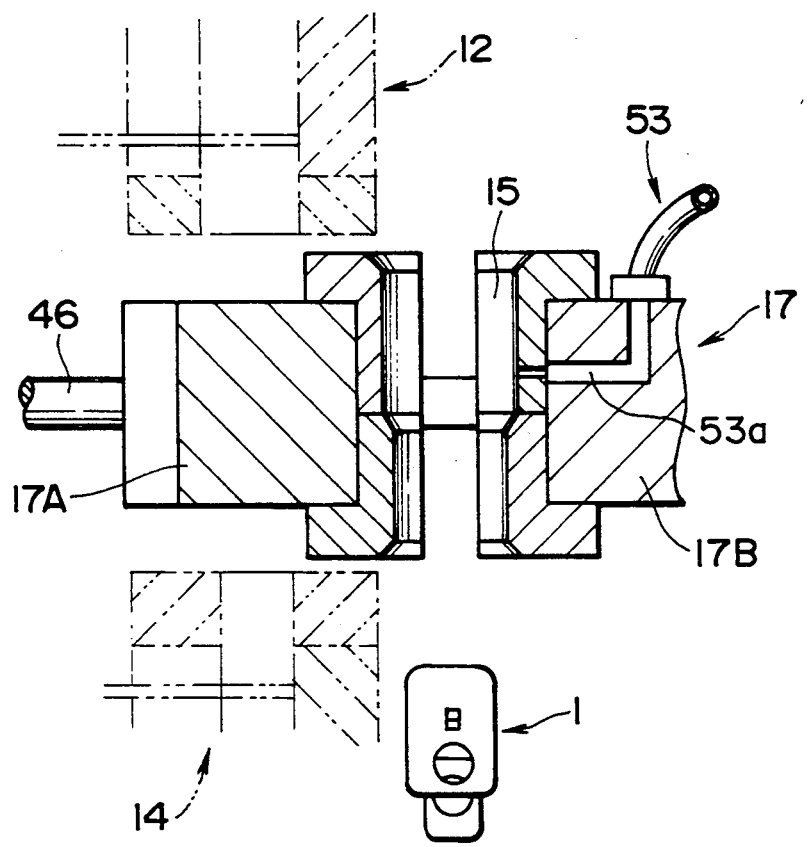
FIG. 14 is a cross-sectional view taken along line XIV—XIV of FIG. 13, showing an air jet mechanism which is associated with the assembling block for removing the cord fastener from a cylindrical assembling chamber of the assembling block.

As shown in FIG. 1, the assembling block 17 is slidably mounted on a pair of laterally spaced guide rods 46, 47 (FIG. 11). The guide rods 46, 47 are disposed between, and extend parallel to, the first and second inclined chutes 11, 13. The guide rods 46, 47 are connected at opposite ends to first and second brackets 44, 45 attached to the vertical support block 24. The fluid-pressure actuator 16 is mounted on the second bracket 45 and has a piston rod 49 connected to the assembling block 17. Thus, the assembling block 17 reciprocates along the guide rods 46, 46 in response to the operation of the fluid-pressure actuator 16. The range of movement of the assembling block 17 is defined by and between an assembling position in which the assembling chamber 15 is disposed between, and aligned with, the first and second pockets 12, 14, as shown in FIG. 12, and a discharging position in which the assembling chamber 15 is laterally displaced off the common central axis of the first and second pockets 12, 14 to such an extent that an assembled cord fastener 1 is permitted to drop without interference with the second pocket 14, as shown in FIG. 14.

Figure 13:
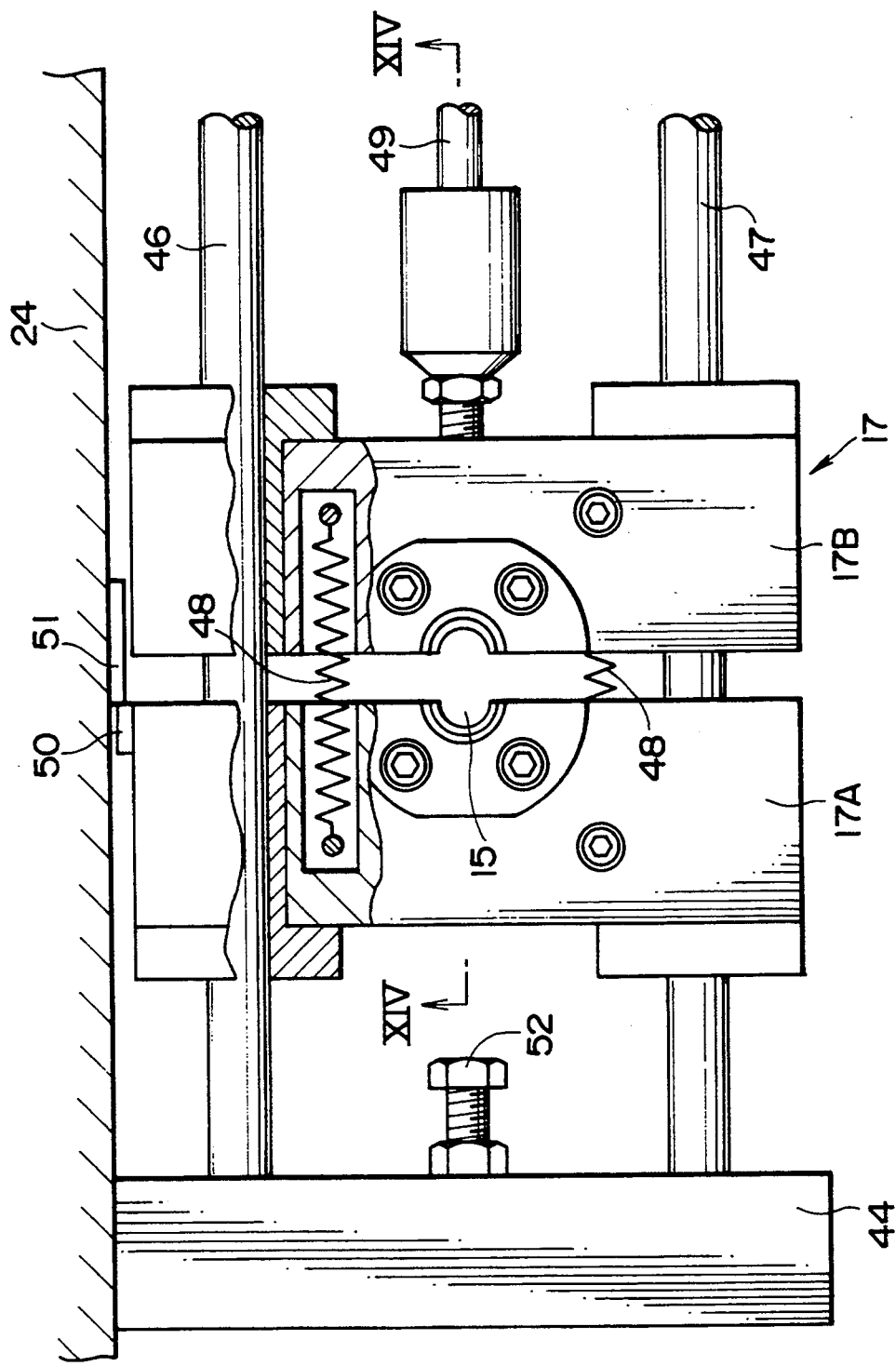
FIG. 13 is a view similar to FIG. 11, but showing the assembling block as it is disposed in a discharging portion for discharging an assembled cord fastener.

As shown in FIGS. 11 and 13, the assembling block 17 is composed of two block halves 17A, 17B which are symmetrical about a plane which contains a longitudinal axis of the cylindrical assembling chamber 15 and extends perpendicular to a path of movement of the assembling block 17. The block halves 17A, 17B are independently movable along the guide rods 46, 47, and they are normally held in contact with each other by the force of two tension coil springs 48, 48 acting between the block halves 17A, 17B. The tension coil springs 48 are connected at opposite ends to the respective block halves 17A, 17B. The piston rod 49 of the fluid-pressure actuator 16 (FIG. 1) is connected to the block half 17B.

The cylindrical assembling chamber 15 is located at the center of the assembling block 17 and divided into two chamber halves each formed in an inner surface of one of the block halves 17A, 17B. As shown in FIG. 12, the cylindrical assembling chamber 15 is stepped so that two fastener members of different outside diameters (i.e., one female member 6 and one male member 3) can be concurrently received in the stepped cylindrical assembling chamber 15. The stepped cylindrical assembling chamber 15 is composed of a large-diameter portion 15a for receiving therein the female member 6, and a small-diameter portion 15b for receiving therein the male member 3. The large-diameter portion 15a is disposed above the small-diameter portion 15b so that when the female member 6 is received in the assembling chamber 15, the female member 6 is supported on a step between the large-diameter portion 15a and the small-diameter portion 15. Thus, the female member 6 is prevented from falling by gravity down from the cylindrical assembling chamber 15. The large-diameter portion 15a has an inside diameter substantially equal to the outside diameter of the female member 6, while the inside diameter of the small-diameter portion 15b is substantially equal to the outside diameter of the male member 3. With this arrangement, the male and female members 3, 6, as they are forced by the second and first pushers 19, 18 into the assembling chamber 15, can be held stably within the assembling chamber 15. However, it is preferable that the inside diameter of the large-diameter portion 15a is slightly smaller than the outside diameter of the female member 6. In this case, the female member 6 is firmly gripped by the block halves 17A, 17B under the force of the tension coil springs 48, 48. Accordingly, an assembled cord fastener 1 can be held within the assembling chamber 15 against accidental detachment from the assembling chamber 15 when the assembling block 17 is transferred from the assembling position to the discharging position.

The block half 17A has a lateral projection or abutment 50 (FIGS. 11 and 13) facing toward the vertical support plate 24. The vertical support plate 24 has a fixed, ridge-like first stopper 51 which is engageable with the abutment 50 to stop movement of the block half 17A in one direction. The abutment 50 and the first stopper 51 are positioned such that the abutment 50 is brought into abutment with the first stopper 51 when the assembling block 17 arrives at the discharging position (see FIG. 13 ). A second stopper 52 comprises a screw and is attached to the first bracket 44. The second stopper 52 is engageable with the block half 17A to stop movement of the assembling block 17 in the opposite direction. The second stopper 52 is positioned such that the block half 17A is brought into abutment with the second stopper 52 when the assembling block arrives at the assembling position shown in FIG. 11.

When the assembling block 17 is transferred from the assembling position (FIG. 11) to the discharging position (FIG. 13), the piston rod 49 of the fluid-pressure actuator 16 (FIG. 1) is contracted. During that time, since the block halves 17A and 17B are urged toward each other by the force of the tension coil springs 48, they are movable concurrently as a single unit toward the discharging position until the assembling block 17 arrives at the discharging position. When the assembling block 17 arrives at the discharging position, the abutment 50 engages the first stopper 51, whereupon a further movement of the block half 17A in the contracting direction of the piston rod 49 is prevented. Thus, the block half 17A is stopped at the discharging position. Since the piston rod 49 is further movable in the contracting direction, a continuing contracting movement of the piston rod 49 causes the block half 17B to displace in a direction away from the block half 17A against the force of the tension coil springs 48. Thus, the block halves 17A, 17B are spaced apart, as shown in FIGS. 13 and 14 with the result that the assembled cord fastener 1 drops from the assembling chamber 15 of the assembling block 17.

When the assembling block 17 is returned from the discharge position (FIG. 13) to the assembling position (FIG. 11 ), the piston rod 49 of the fluid-pressure actuator 16 (FIG. 1) is extended. As the piston rod 49 advances, the block half 17B is brought into contact with the block half 17A, thereby closing or completing the assembling chamber 15. Thereafter, the block halves 17A, 17B move as a single unit toward the assembling position. Movement of the assembling block 17 in the extending direction of the piston rod 49 is stopped when the block half 17A abuts on the second stopper 52. In this instance, the assembling block 17 arrives at the assembling position.

The cord fastener assembling apparatus 1 of the foregoing construction operates as follows.

The operation of the apparatus 1 begins with parts in a condition shown in FIG. 1. A succession of the female members 6 is delivered by gravity from the non-illustrated first parts feeder to the first pocket 12 via the first inclined chute 11. The leading female member 6 is received in, and temporarily held within, the first pocket 12 with its open end facing toward an obliquely downward direction. The next female member 6 is held in contact with the leading female member 6, as shown in FIG. 1. Similarly, a succession of the male members 3 is delivered by gravity from the non-illustrated second parts feeder to the second pocket 14 via the second inclined chute 13. The leading male member 3 is received in, and temporarily held within, the second pocket 14 with its foot-like engagement portions 7 (FIG. 2A) directed in an obliquely upward direction. The next male member 3 is held in contact with the leading male member 3, as shown in FIG. 1. The first and second pushers 18 and 19 are held in their retracted standby positions shown in FIGS. 7 and 10, respectively. The assembling block 17 is disposed in the assembling position in which the stepped, substantially cylindrical assembling chamber 15 is disposed between, and aligned with, the first pocket 12 and the second pocket 14, as shown in FIG. 12.

The non-illustrated fluid-pressure actuators which are connected respectively to the first and second pushers 18, 19 are operatively connected with the non-illustrated control unit of the apparatus 10. Similarly, the fluid-pressure actuator 16 (FIG. 1) which is connected to the assembling block 17 is operatively connected with the non-illustrated control unit of the apparatus 10. The operation of these actuators are controlled by the control unit such that the first and second pushers 18, 19 and the assembling block 17 move in timed relation to one another so as to automatically repeat a predetermined cycle of operation.

Figure 15:
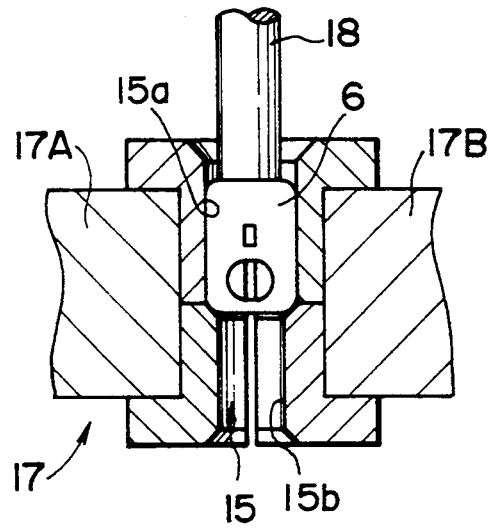
FIG. 15 is a cross-sectional view of a portion of the cord fastener assembling apparatus, showing a first pusher advanced to force a female member into the cylindrical assembling chamber of the assembling block.

At first, the first pusher 18 shown in FIG. 7 is driven forwardly. As the first pusher 18 advances, the female member 6 is forced downward from the first pocket 12 into the large-diameter portion 15a of the stepped cylindrical assembling chamber 15. The downward movement of the female member 6 is stopped when the open end of the female member 6 abuts on the step between the large-diameter portion 15a and the small-diameter portion 15b of the stepped cylindrical assembling chamber 15, as shown in FIG. 15. The female member 6 is thus set in the large-diameter portion 15a of the stepped cylindrical assembling chamber 15. The first pusher 18 is kept in its fully advanced position. The first pusher 18 when disposed in this fully advanced position serves as a die which retains thereon the female member 6 when the male member 3 is driven into the female member 6 in a manner described below.

Figure 16:
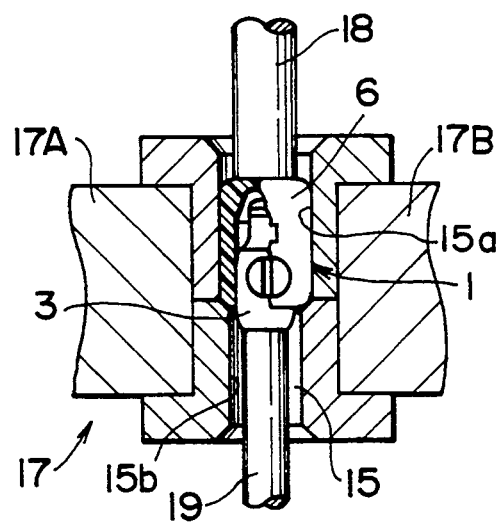
FIG. 16 is a view similar to FIG. 15, but showing a second pusher advanced to force a male member into the female member, thus assembling the male and female members into a cord fastener within the cylindrical assembling chamber of the assembling block.

Then, the second pusher 19 shown in FIG. 10 is driven forwardly whereby the male member 3 is forced upward from the second pocket 14 into the stepped cylindrical assembling chamber 15. As the second pusher 19 advances, the male member 3 moves first into the small-diameter portion 15b of the stepped cylindrical assembling chamber 15 and subsequently is forced into the female member 6. Since the upward movement of the female member 6 is prevented by the first pusher 18, a further advancing movement of the second pusher 19 causes the foot-like engagement portions 7 (FIGS. 2(A) and 3) to move into snap fit with the lug-like engagement portions 8 (FIGS. 2(B) and 3). Thus, the male member 3 and the female member 6 are assembled into a cord fastener, as shown in FIG. 16.

Subsequently, the first and second pushers 18 and 19 are returned to their retracted initial positions shown in FIG. 12 whereupon the next female member 6 and the next male member 3 are delivered by gravity from the first inclined chute 11 and the second inclined chute 13, respectively, into the first pocket 12 and the second pocket 14. Since the block halves 17A and 17B of the assembling block 17 are urged toward each other by means of the tension coil springs 48 (FIGS. 11 and 13), the assembled cord fastener 1 is gripped by the block halves 17A, 17B within the assembling chamber 15.

Thereafter, the fluid-pressure actuator 16 (FIG. 1) is driven to contract its piston rod 49, thereby transferring the assembling block 17 from the assembling position (FIGS. 11 and 12) toward the discharging position (FIGS. 13 and 14). When the assembling block 17 arrives at the discharging position, the abutment 50 on the block half 17A abuts on the first stopper 51 on the vertical support plate 24. With this abutting engagement between the abutment 50 and the first stopper 51, the block half 17A is prevented from further moving in the contracting direction of the piston rod 49. Since the piston rod 49 is further movable in the contracting direction, a continuing contracting movement of the piston rod 49 causes the block half 17B to displace in a direction away from the block half 17A against the force of the tension coil springs 48, as shown in FIGS. 13 and 14. Thus, the assembling block 17 splits open and releases the assembled cord fastener 1. The thus released cord fastener 1 is allowed to fall into a container (not shown) disposed directly below the discharge position. Subsequently, the fluid-pressure actuator 16 is activated again to extend its piston rod 49 whereby the block assembly 17 is returned to the assembling position located between the first and second pockets 12, 14.

The foregoing cycle of operation is repeated until a desired number of assembled cord fasteners are produced.

The cord fastener assembling apparatus 10 of the present invention has various advantages described below.

The female members 6 and the male members 3 are delivered in succession to the first and second pockets 12, 14, respectively, via the first and second inclined chutes 11, 13 without the need for separate feed mechanisms. The apparatus 10 is, therefore, simple in construction and can be manufactured less costly. In addition, all of the movable components, such as the assembling block 17 and the first and second pushers 18, 19, which take part in assembling the cord fasteners 1 are constructed to reciprocate along straight paths. The linearly reciprocating components 17-19 are simple in construction, easy to control and hence well suited for an automated mass-production of the cord fasteners 1.

The cord fastener assembling apparatus 10 may further include an air jet means or mechanism 53, as shown in FIG. 14. The air jet mechanism 53 is associated with the assembling block 17 for releasing the assembled cord fastener 1 from the assembling block 17 by means of a stream of air ejected into the assembling chamber 15. The air jet mechanism 53 includes an air nozzle 53a formed in one block member 17B and opens to the assembling chamber 15. The air nozzle 53a is connected with a compressed air source, such as an air compressor (not shown). The air jet mechanism 53 is activated when the assembling block 17 is opened at the discharging position. Upon activation of the air jet mechanism 53, a stream of air is ejected from the air nozzle 53a, forcibly separating the assembled cord fastener 1 from the peripheral surface of the cylindrical assembling chamber 15. Thus, the assembled cord fastener 1 is released quickly and reliably from the assembling block 17.

Figure 4:
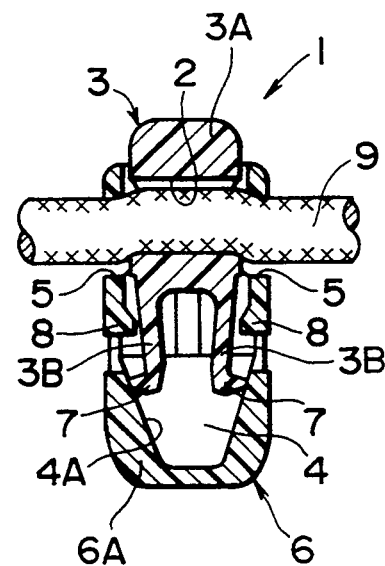
FIG. 4 is a cross-sectional view of the cord fastener with a cord locked in position against displacement.
Figure 17:
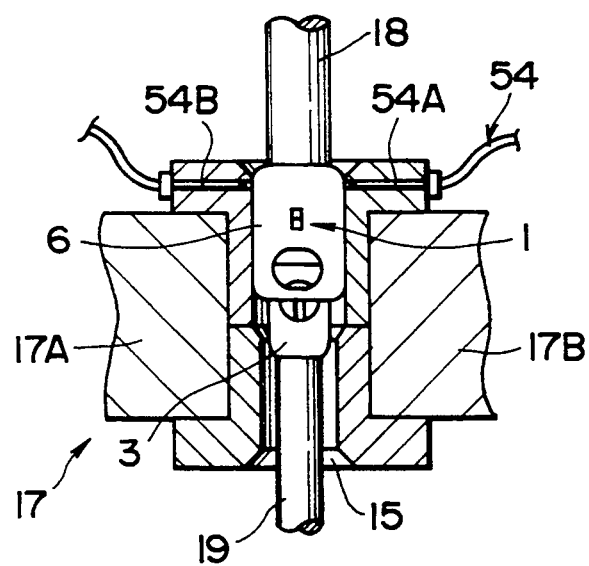
FIG. 17 is a cross-sectional view similar to FIG. 16, but showing a cord fastener inspection mechanism which is associated with the assembling block in order to discriminate a defective cord fastener from a non-defective cord fastener.

As previously mentioned, the male member 3 to be assembled with the female member 6 has a pair of resilient legs 3B, 3B each including one of the foot-like engagement portions 7, as shown in FIG. 2(A). The female member 6 has a tapered inner surface 4A defining a lower portion of the axial hole 4 of the female member 6, as shown in FIG. 2(B). The male member 3 and the female member 6 are coupled together, as shown in FIG. 3. In this assembled condition, the foot-like engagement portions 7 of the legs 3B, 3B are held in interlocking engagement with the lug-like engagement portions 8 of the female member 6 under the resiliency of the legs 3B, 3B. In use of the cord fastener 1, the cord fastener 1 is compressed endwise or in the axial direction. In this instance, the resilient legs 3B, 3B are resiliently deformed or flexed inwardly as the foot-like engagement portions 7 of the legs 3B, 3B slide downwardly along the tapered inner surface 4A. When the cord fastener 1 is released from the endwise pressure, the male member 3 is moved upwardly because the foot-like engagement portions 7 of the legs 3B, 3B are urged by the resilient force stored in the inwardly flexed legs 3B, 3B to slide upwardly along the tapered inner surface 4A of the female member 6. Thus, the cord 9 is firmly gripped by and between the male and female members 3, 6 against accidental displacement, as shown in FIG. 4. The legs 3B, 3B are generally formed in a slender shape in order to possess a desired degree of resiliency. The slender slider legs 3B, 3B may be rarely broken when the male and female members 3, 6 are forced together. If the leg or legs are broken, they are no longer possible to exert a resilient force on the tapered inside surface 4A of the female member 6, tending to move the male member 3 relative to the female member 6 in an axially outward direction of the female member 6. In order to discriminate such a defective cord fastener from a non-defective cord fastener, the apparatus may further include a cord fastener inspection means or mechanism 54 such as shown in FIG. 17.

The inspection mechanism 54 comprises a micro photosensor mounted in the assembling block 17 adjacent to an upper end of the assembling chamber 15. The micro photosensor 54 is composed of a light projector 54A mounted in the block member 17B and a photocell 54B mounted in the block member 17A in confronting relation to the light projector 54A across the assembling chamber 15. In operation, the first and second pushers 18 and 19 are driven forwardly in the same manner as described above. Thus, the male member 3 and the female member 6 are assembled into an assembled cord fastener 1 within the assembling chamber 15. In this assembled condition, the cord fastener 1 is compressed endwise so that the resilient legs 3B, 3B (see FIG. 3) are flexed inwardly. Then, the first pusher 18 is retracted to such an extent that the female member 6 is able to move upwardly relative to the male member 3 under a spring force acting between the male and female member, as shown in FIG. 17. More specifically, the tapered inner surface 4A (see FIG. 3) of the female member 6 is urged by the resilient force stored in the inwardly flexed legs 3B, 3B to slide upwardly on the foot-like engagement portions 7 of the legs 3B, 3B. The upwardly displaced female member 6 blocks a light path between the light projector 54A and the photocell 54B. Thus, light coming from the light projector 54A is prevented from falling on the photocell 54B. In this instance, the photosensor 54 issues a first electric signal which represents the detection of a non-defective assembled cord fastener. The first electric signal is supplied to the non-illustrated control unit, instructing the control unit to proceed the assembling operation. On the other hand, if the female member 6 is not displaced upwardly due, for example, to the breakage of either leg 3B, the light path between the light projector 54A and the photocell 54B is not blocked. The photosensor 54 issues a second electric signal which represents the detection of a defective assembled cord fastener. The second electric signal is supplied to the non-illustrated control unit, instructing the control unit to discharge the thus detected defective cord fastener to a container which is different from the container provided for the non-defective cord fasteners.

The assembling block 17 which is described above in conduction with the illustrated embodiment is separated into two block halves 17A, 17B so as to facilitate the removal of the assembled cord fastener 1 from the assembling block 17. It is possible, according to the invention, to use a single, non-separated assembling block (not shown) in which instance the assembled cord fastener is discharged from the assembling chamber by means of another pusher (not shown) which is reciprocally movable through the assembling chamber.

In the illustrated embodiment, the first inclined chute 11 is used for the gravity delivery of the female members 6, while the second inclined chute 13 is used for the gravity delivery of the male members 3. The relation between the inclined chutes 11, 13 and the fastener members 3, 6 may be reversed with appropriate modifications of the related components such as the first pocket 12, the second pocket 14 and the assembling block 17.

Obviously, various minor changes and modifications of the present invention are possible in the light of the above teaching. It is therefore to be understood that within the scope of the appended claims the invention may be practiced otherwise than as specifically described.

What is claimed is:

1. An apparatus for assembling cord fasteners, an assembled cord fastener being comprised of a male member composed of a head having a transverse cord insertion through-hole, and at least one resilient leg extending integrally from the head in a perpendicular direction of the transverse cord insertion through-hole and having an engagement portion, and a female member composed of a hollow body having an axial hole extending from an open end of the hollow body for receiving therein the at least one leg and head, a pair of diametrically opposite transverse cord insertion holes communicating with the axial hole, and at least one engagement portion projecting into the axial hole and interlocked with the engagement portion of the at least one resilient leg to couple the male member and the female member, the male member and the female member being relatively displaceable toward and away from each other, by and against a resilient force of the at least one leg acting on an inner surface of the axial hole, so that the transverse cord insertion through-hole is brought into and out of coaxial alignment with the transverse cord insertion holes, said apparatus comprises:

(a) a first inclined chute for delivering by gravity a succession of female members in a first direction, with the open ends of the respective female members facing toward a second direction which is perpendicular to said first direction;

(b) a first pocket disposed on a lower end of said first inclined chute for receiving a leading one of the successive female members from said first inclined chute and temporarily holding therein the leading female member, with the open end of the leading female member facing toward said second direction;

(c) a second inclined chute extending parallel to, and vertically spaced from, said first inclined chute for delivering by gravity a succession of male members in a third direction parallel to said first direction, with the at least one resilient leg of the respective male members directed toward a fourth direction which is opposite to said second direction;

(d) a second pocket disposed on a lower end of said second inclined chute for receiving a leading one of the successive male members from said second inclined chute and temporarily holding therein the leading male member, with the at least one resilient leg of the leading male member directed in said fourth direction, said second pocket being vertically spaced from said first pocket and aligned with said first pocket;

(e) an assembling block having an elongated assembling chamber for receiving therein the female member and the male member respectively from said first pocket and said second pocket, said assembling block being reciprocally movable between an assembling position in which said assembling chamber is disposed between and aligned with said first and second pockets, and a discharging position in which said assembling chamber is disposed out of alignment with said first and second pocket for enabling discharge of an assembled cord fastener from said assembling chamber;

(f) a first pusher reciprocally movable into and out of said first pocket for forcing said female member from said first pocket into said assembling chamber of said assembling block; and (g) a second pusher reciprocally movable, in timed relation to the reciprocating movement of said first pusher, into and out of said second pocket for forcing the male member from said second pocket into said assembling chamber so as to ensure that the engagement portion of the male member and the engagement portion of the female member are interlocked with each other to couple the male member and the female member within said assembling chamber.

2. An apparatus according to claim 1, wherein the head of the male member is substantially cylindrical and having a first outside diameter, and the body of the female member is substantially hollow cylindrical and having a second outside diameter which is larger than the first outside diameter, and wherein said elongated assembling chamber is a stepped substantially cylindrical assembling chamber and including a large-diameter portion and a small-diameter portion, said large-diameter portion being disposed above said small-diameter portion, said first inclined chute being disposed above said second inclined chute.

3. An apparatus according to claim 1, further including first sensor means associated with said first pocket for detecting the presence/absence of the leading female member within said first pocket, and second sensor means associated with said second pocket for detecting the presence/absence of the leading male member within said second pocket, said first sensor means being operative to stop operation of said apparatus when the absence of the leading female member is detected by said first sensor means, said second sensor means being operative to stop operation of said apparatus when the absence of the leading male member is detected by said second sensor means.

4. An apparatus according to claim 3, wherein said first sensor means comprises a first photosensor composed of a light projector and a photocell that are confronted with each other across an internal space of said first pocket in which the leading female member is received, and wherein said second sensor means comprises a second photosensor composed of a light projector and a photocell that are confronted with each other across an internal space of said second pocket in which the leading male member is received.

5. An apparatus according to claim 1, further including an inspection means associated with said assembling block for determining whether the cord fastener which has been assembled within said assembling chamber is a defective cord fastener or a non-defective cord fastener.

6. An apparatus according to claim 5, wherein said first and second pushers are operated to compress the male and female members to couple the male and female members such that when released from a pressure by said first and second pushers, the male and female members are able to displace in a direction away from each other by the resiliency of the at least one resilient leg, and wherein said inspection means comprises a sensor capable of detecting the occurrence of the relative displacement in said direction between the male member and the female member within said assembling chamber.

7. An apparatus according to claim 6, wherein said sensor comprises a photosensor composed of a light projector and a photocell that are confronted with each other across said assembling chamber.

8. An apparatus according to claim 7, wherein said assembling block is composed of two block halves which are symmetrical with each other about a plane containing a longitudinal central axis of said cylindrical assembling chamber, said light projector being mounted in one of said two block halves, said photocell being mounted in the other of said two block halves.

9. An apparatus according to claim 1, wherein said first pocket includes a pair of confronting first support blocks reciprocally movable toward and away from each other for releasably holding therebetween the leading female member within said first pocket, and wherein said second pocket includes a pair of confronting second support blocks reciprocally movable toward and away from each other for releasably holding therebetween the leading male member within said second pocket.

10. An apparatus according to claim 9, wherein said first support blocks are movable between a first advanced position in which said first support blocks hold therebetween the leading female member, and a first retracted position in which said first support blocks release the leading female member, said first pocket further including a pair of first springs associated with said first support blocks, respectively, and urging said first support blocks into said first advanced position, and wherein said second support blocks are movable between a second advanced position in which said second support blocks hold therebetween the leading male member, and a second retracted position in which said second support blocks release the leading male member, said second pocket further including a pair of second springs associated with said second support blocks, respectively, and urging said second support blocks into said second advanced position.

11. An apparatus according to claim 1, wherein the head of the male member is substantially cylindrical and has a pair of arcuate recesses formed at opposite ends of the transverse cord insertion through-hole, said first inclined chute including a pair of parallel spaced, elongated side plates each having an inner longitudinal edge slidably engageable with a corresponding one of the arcuate recesses of the male member for guiding the male member as the male member is delivered through said first inclined chute, and wherein the body of the female member is substantially hollow cylindrical and has a pair of arcuate recesses formed at outer ends of the respective transverse cord insertion holes, said second inclined chute including a pair of parallel spaced, elongated side plates each having an inner longitudinal edge slidably engageable with a corresponding one of the arcuate recesses of the female member for guiding the female member as the female member is delivered through said second inclined chute.

12. An apparatus according to claim 11, wherein said first pocket includes a pair of confronting first support blocks reciprocally movable toward and away from each other for releasably holding therebetween the leading female member within said first pocket, said first supporting blocks having a pair of first guide projections, respectively, on their confronting inner ends, said first guide projections being receivable in the arcuate recesses of the leading female member to hold the leading female member within said first pocket, and wherein said second pocket includes a pair of confronting second support blocks reciprocally movable toward and away from each other for releasably holding therebetween the leading male member within said second pocket, said second supporting blocks having a pair of second guide projections, respectively, on their confronting inner ends, said second guide projections being receivable in the arcuate recesses of the leading male member to hold the leading male member within said second pocket.

13. An apparatus according to claim 12, wherein said first support blocks are movable between a first advanced position in which said first guide projections are loosely fitted in the arcuate recesses of the leading female member, and a first retracted position in which said first guide projections are disengaged from the arcuate recesses of the leading female member, said first pocket further including a pair of first springs associated with said first support blocks, respectively, and urging said first support blocks into said first advanced position, and wherein said second support blocks are movable between a second advanced position in which said second guide projections are loosely fitted in the arcuate recesses of the leading male member, and a second retracted position in which said second guide projections are disengaged from the arcuate recesses of the leading male member, said second pocket further including a pair of second springs associated with said second support blocks, respectively, and urging said second support blocks into said second advanced position.

14. An apparatus according to claim 1, wherein said assembling block is composed of two block halves which are symmetrical with each other about a plane containing a longitudinal central axis of said assembling chamber, and a spring means acting between said two block halves and urges them toward each other, said two block halves being displaceable in a direction away from each other against the force of said spring means when said assembling block is disposed in said discharging position.

15. An apparatus according to claim 14, further including a fluid-pressure actuator having a piston rod connected to one of said block halves for reciprocating said assembling block between said assembling position and said discharging position, and a fixed stopper defining one end of reciprocating movement of the other block half, wherein said other block half includes an abutment engageable with said fixed stopper when said assembling block arrives at said discharging position, said fluid-pressure actuator being operative to move said one block half in a direction away from said other block half against the force of spring means after said other block half arrives at said discharging position.

16. An apparatus according to claim 14, further including means associated with at least one of said two block halves for ejecting a stream of air into said assembling chamber to release the assembled cord fastener from said assembling chamber.

17. An apparatus according to claim 16, wherein said ejecting means comprises an air nozzle provided in said at least one block half and opening to said assembling chamber.

18. An apparatus according to claim 14, wherein the head of the male member is substantially cylindrical and having a first outside diameter, and the body of the female member is substantially hollow cylindrical and having a second outside diameter which is larger than the first outside diameter, and wherein said elongated assembling chamber is a stepped substantially cylindrical assembling chamber and including a large-diameter portion and a small-diameter portion, said large-diameter portion having an inside diameter which is slightly smaller than said second outside diameter of the female member.

* * * * *